United States Patent
Kannan

(10) Patent No.: US 7,997,482 B2
(45) Date of Patent: *Aug. 16, 2011

(54) ACCESS TO A REMOTE MACHINE FROM A LOCAL MACHINE VIA SMART CARD

(75) Inventor: Chandrasekar Kannan, Sunnyvale, CA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/898,290

(22) Filed: Oct. 5, 2010

(65) Prior Publication Data

US 2011/0017821 A1 Jan. 27, 2011

Related U.S. Application Data

(63) Continuation of application No. 11/712,760, filed on Feb. 28, 2007, now Pat. No. 7,823,775.

(51) Int. Cl.
*G06K 5/00* (2006.01)
(52) U.S. Cl. ......... 235/380; 235/492; 235/487; 235/451
(58) Field of Classification Search ................ 235/380, 235/492, 451, 487, 382; 705/64–77
See application file for complete search history.

(56) References Cited

U.S. PATENT DOCUMENTS

| | | |
|---|---|---|
| 6,438,550 B1 | 8/2002 | Doyle et al. |
| 7,437,560 B1 | 10/2008 | Page et al. |
| 2002/0147912 A1* | 10/2002 | Shmueli et al. ............... 713/182 |
| 2003/0005329 A1 | 1/2003 | Ikonen |
| 2003/0052788 A1 | 3/2003 | Kwong-Tai Chung |
| 2005/0015275 A1 | 1/2005 | Takekawa et al. |
| 2005/0269401 A1 | 12/2005 | Spitzer et al. |
| 2008/0091944 A1 | 4/2008 | Von Mueller et al. |
| 2008/0191009 A1* | 8/2008 | Gressel et al. ................ 235/382 |

* cited by examiner

*Primary Examiner* — Edwyn Labaze
(74) *Attorney, Agent, or Firm* — Lowenstein Sandler PC

(57) ABSTRACT

A method and apparatus for accessing a remote machine from a local machine via a smart card. In one embodiment, the presence of the smart card coupled to the local machine is detected. A card reader reads the credentials from the smart card and communicates them to a remote access client application of the local machine. The remote access client application transmits the credentials to the remote machine. The remote machine sends a query for login information to the local machine upon valid credentials. The local machine transmits the login information to the remote machine and is granted permission to access the remote machine upon valid login information.

19 Claims, 7 Drawing Sheets

ACCESS TO A REMOTE MACHINE FROM A LOCAL MACHINE VIA SMART CARD

RELATED APPLICATION

This is a continuation of U.S. patent application Ser. No. 11/712,760, filed on Feb. 28, 2007, which is hereby incorporated by reference.

TECHNICAL FIELD

Embodiments of the present invention relate to remotely accessing a machine, and more specifically to accessing a remote machine from a local machine via a smart card.

BACKGROUND

Smart cards are plastic cards having an embedded Integrated Circuit (IC). That IC may be a logic circuit with its associated memories or a microcontroller with its associated memories and software, or a microcontroller with its associated memories and software coupled to a custom circuit block or interface.

When personal computers are utilized in a home environment or office environment, it is often desirable to impose some measure of security and/or parental control over use of the computer. As such smart cards may be used for secure logon to a desktop by inserting the card in a card reader coupled to the desktop when required. However, a user wishing to remotely access his desktop from another location may not be able to do so if the desktop is smart card protected.

BRIEF DESCRIPTION OF THE DRAWINGS

The present invention is illustrated by way of example, and not by way of limitation, in the figures of the accompanying drawings and in which.

DETAILED DESCRIPTION

Figure 1:
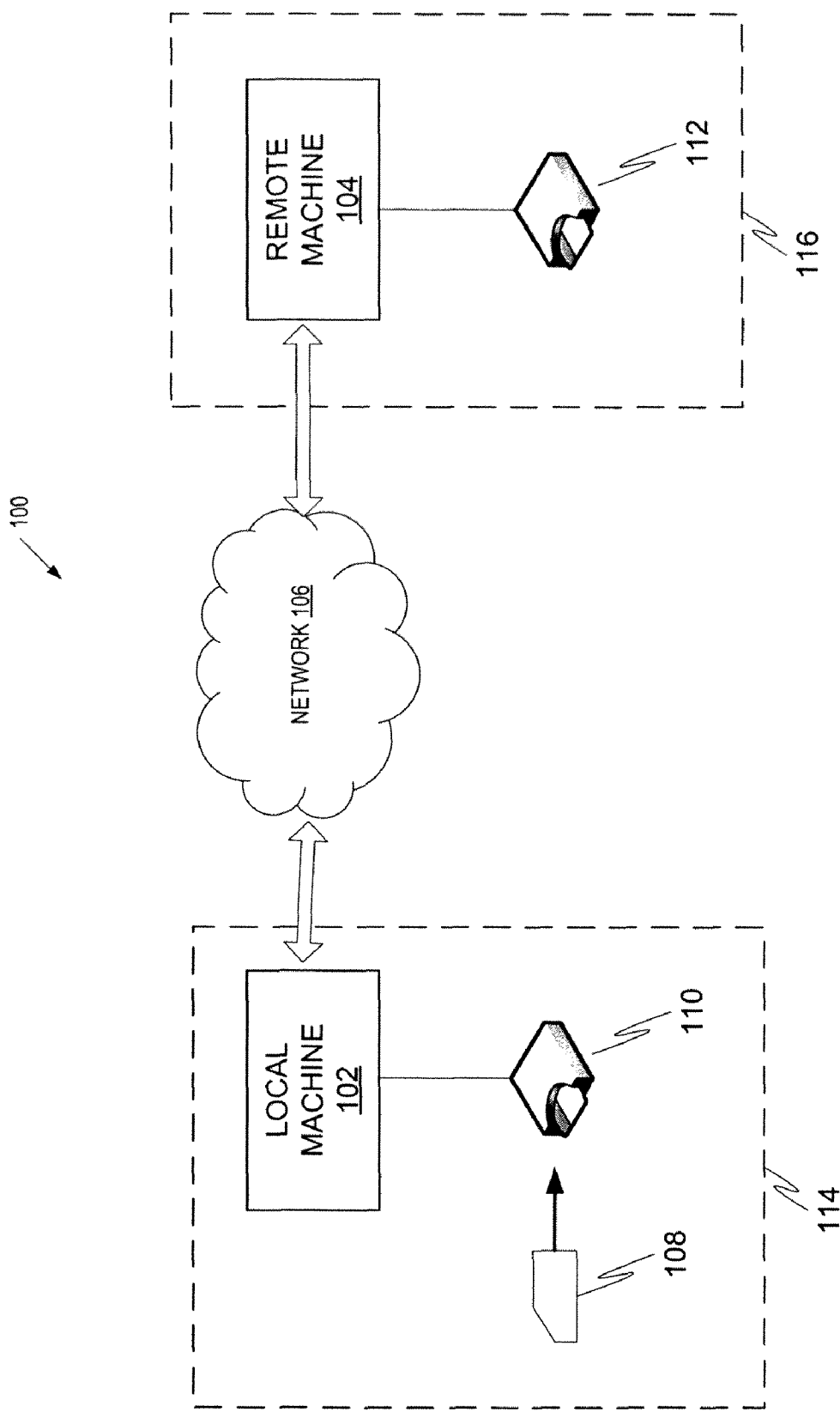
FIG. 1 illustrates a network architecture in which embodiments of the present invention may be implemented.

Described herein is a method and apparatus for accessing a remote machine from a local machine via a smart card. In one embodiment, the presence of the smart card coupled to the local machine is detected. A card reader reads the credentials from the smart card and communicates them to a remote access client application of the local machine. The remote access client application then transmits the credentials to the remote machine. The remote machine sends a query for login information to the local machine upon valid credentials. The local machine transmits the login information to the remote machine and is granted permission to access the remote machine upon valid login information.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-accessible storage medium includes any mechanism for storing or transmitting information in a form readable by a machine (e.g., a computer). For example, a machine-accessible storage medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

System Architecture

FIG. 1 illustrates an exemplary network architecture 100 in which embodiments of the present invention may operate. The network architecture 100 may include a local machine 102, a remote machine 104, and a network 106. The local and remote machines 102, 104 may be, for example, personal computers (PCs), mobile phones, palm-sized computing devices, personal digital assistants (PDAs), etc. The local machine 102 may be also referred to in this application as a client machine, a client, or a local device. The remote machine 104 may be also referred to in this application as a server machine, a server, or a remote device.

Local machine 102 may communicate with remote machine 104 via the network 106, which may be a public network (e.g., Internet) or a private network (e.g., Ethernet or a local area Network (LAN)). Local machine 102 is located at a local location 114 (e.g. home). Local location 114 may also include a card reader 110 coupled to local machine 102. Card reader 110 may be used for reading/decoding a card 108. Card reader 110 may include card readers commonly known to those skilled in the art. In accordance with one embodiment, the card 108 includes a smart card. Those of ordinary skills in the art will recognize that card 108 may include any type of cards having encoded or encrypted information on the card. The card may provide an additional authentication means to access the remote machine 104 and any other machine securely coupled to the remote machine 104, for example, a server that the remote machine 104 has access to.

Remote machine 104 is located at a remote location 116 (e.g. work). Remote location 116 may also include a card reader 112 coupled to remote machine 104. In accordance with one embodiment, the carder readers 110 and 112 may be of a similar type of card reader. In accordance with another embodiment, card reader 112 used at local location 114. For example, a user wishing to access his computer at work may be able to disconnect the card reader at work and bring it home to connect it to his home computer.

In accordance with one embodiment, local machine 102 communicates with remote machine 104 via a web browser and/or via one or more applications or modules that communicate with remote machine 104.

The following example is for illustration purposes. A user needs to present his smart card to access his work computer at work. At home, the user may be able to present his smart card on a reader connected to his home computer to remotely access his work computer.

Local Machine

Figure 2:
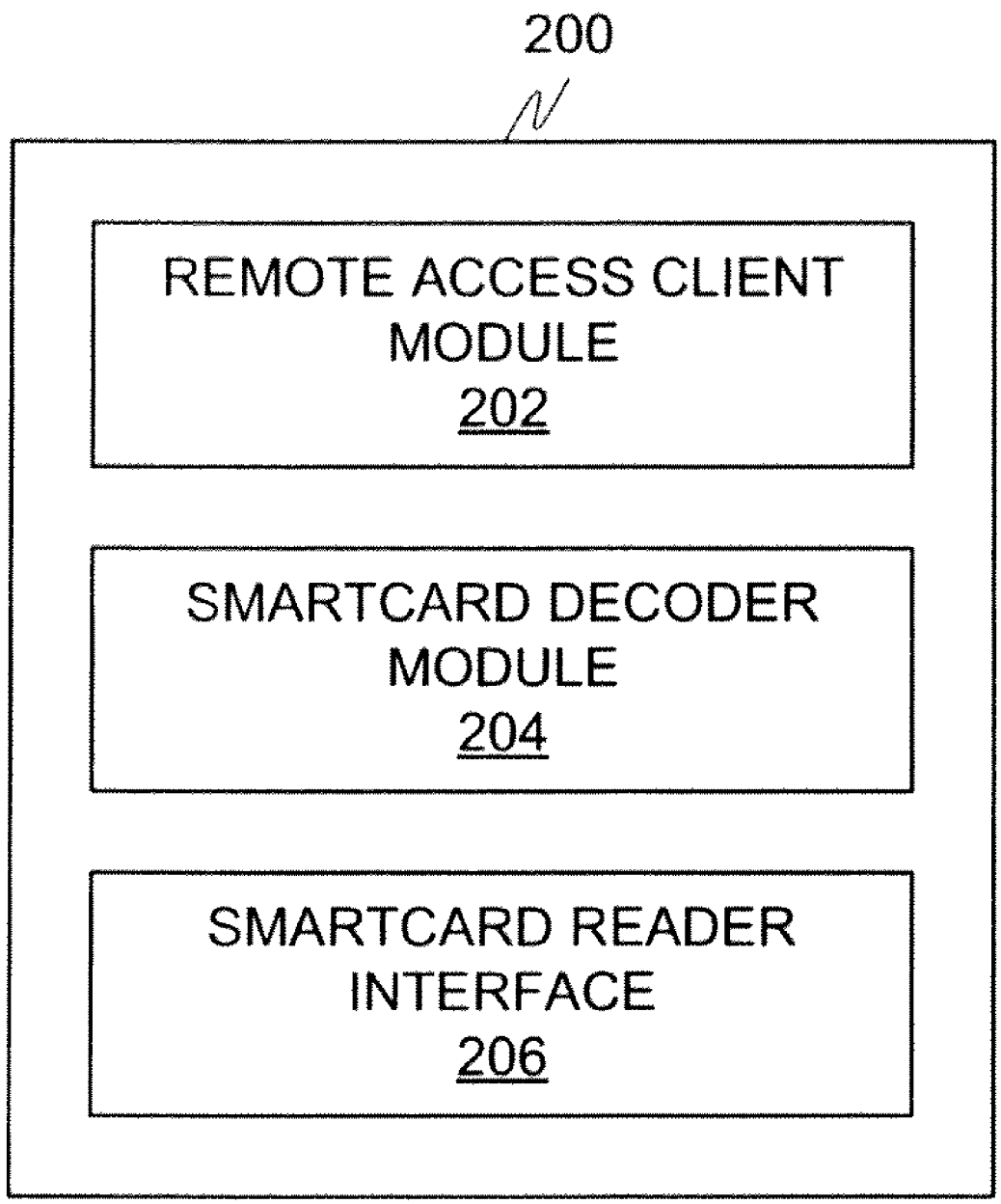
FIG. 2 illustrates a block diagram of one embodiment of a local machine.

FIG. 2 illustrates one embodiment of a local machine 200 for use in the network architecture 100 of FIG. 1. Local machine 200 may include several modules or components: a remote access client module 202, a smart card decoder module 204, and a smart card reader interface 206. Smart card reader interface 206 interfaces with card reader 110 and allows local machine 200 to read a smart card inserted in card reader 110. Smart card module 204 communicates with smart card reader interface 206 to read and decode/decrypt any information (e.g. credentials) on the smart card 108.

Remote access client module 202 are well known to those of ordinary skills in the art and include applications allowing a user to remotely access a computer via a network. Such application may be web-based, or application-based. In one embodiment, an add-on or plug-in module enabling a communication between smart card decoder module 204 and remote access client module 202 may be installed in the local machine 200. In one embodiment, remote access client module 202 is enabled to receive credentials provided by smart card module 204. Remote access client module 202 subsequently may communicate with a remote access server module of a remote machine via a network to access the remote machine.

Figure 4:
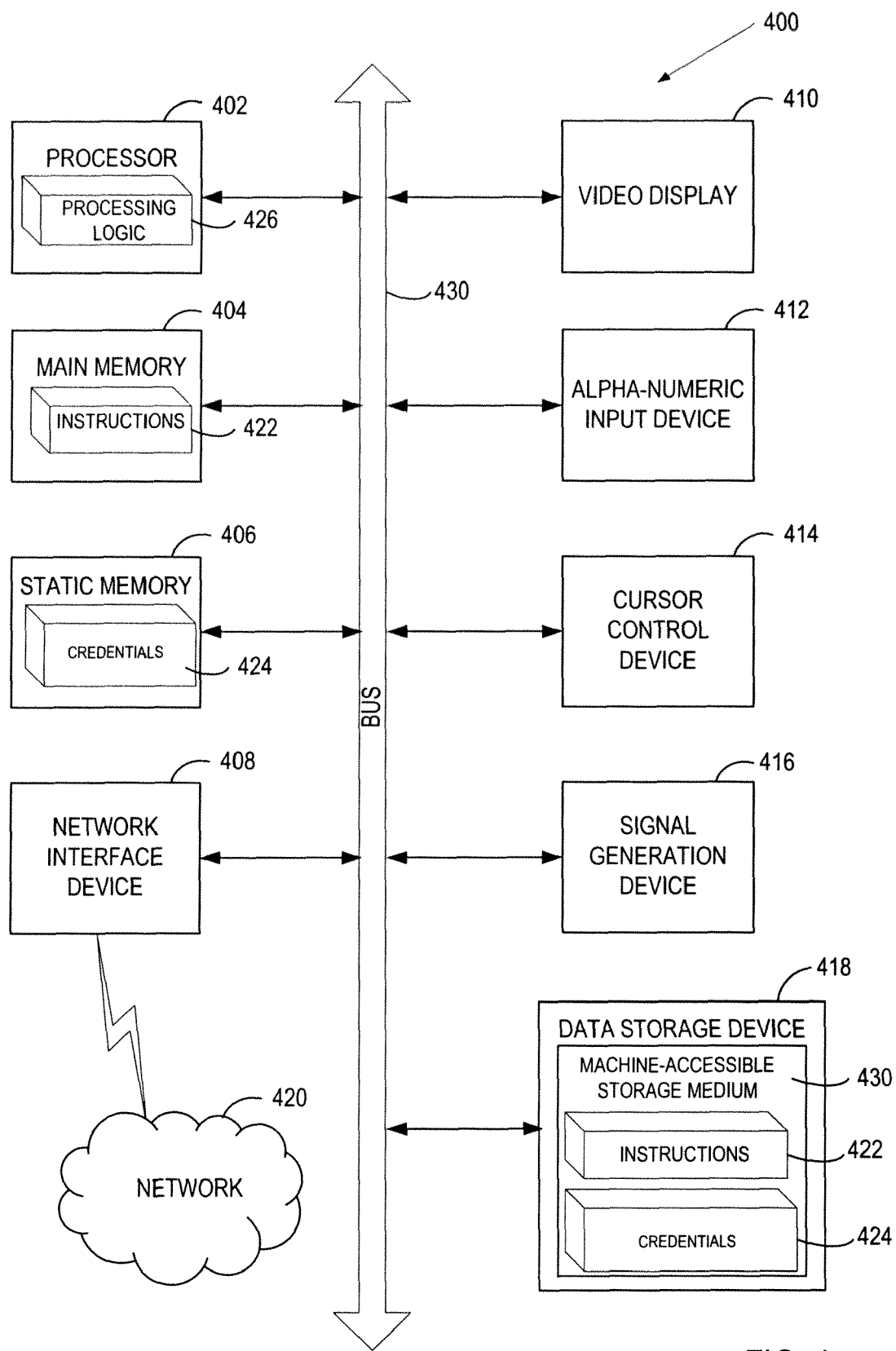
FIG. 4 illustrates a block diagram of an exemplary local computer system.

FIG. 4 illustrates a diagrammatic representation of a machine in the exemplary form of a computer system 400 illustrative of local machine 200. In one embodiment, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an input device 412 (e.g., a keyboard or a card reader), a cursor control device 414 (e.g., a mouse), and a signal generation device 416 (e.g., a speaker).

The data storage device 418 may include a machine-accessible storage medium 430 on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-accessible storage media. The software 422 may further be transmitted or received over a network 420 via the network interface device 408.

The machine-accessible storage medium 430 may also be used to store credentials 424 or smart card information obtained from the smart card. Credentials 424 may also be stored in other sections of computer system 400, such as static memory 406. In accordance with another embodiment, credentials from the smart card may not be saved anywhere on computer system 400.

While the machine-accessible storage medium 430 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

Remote Machine

Figure 3:
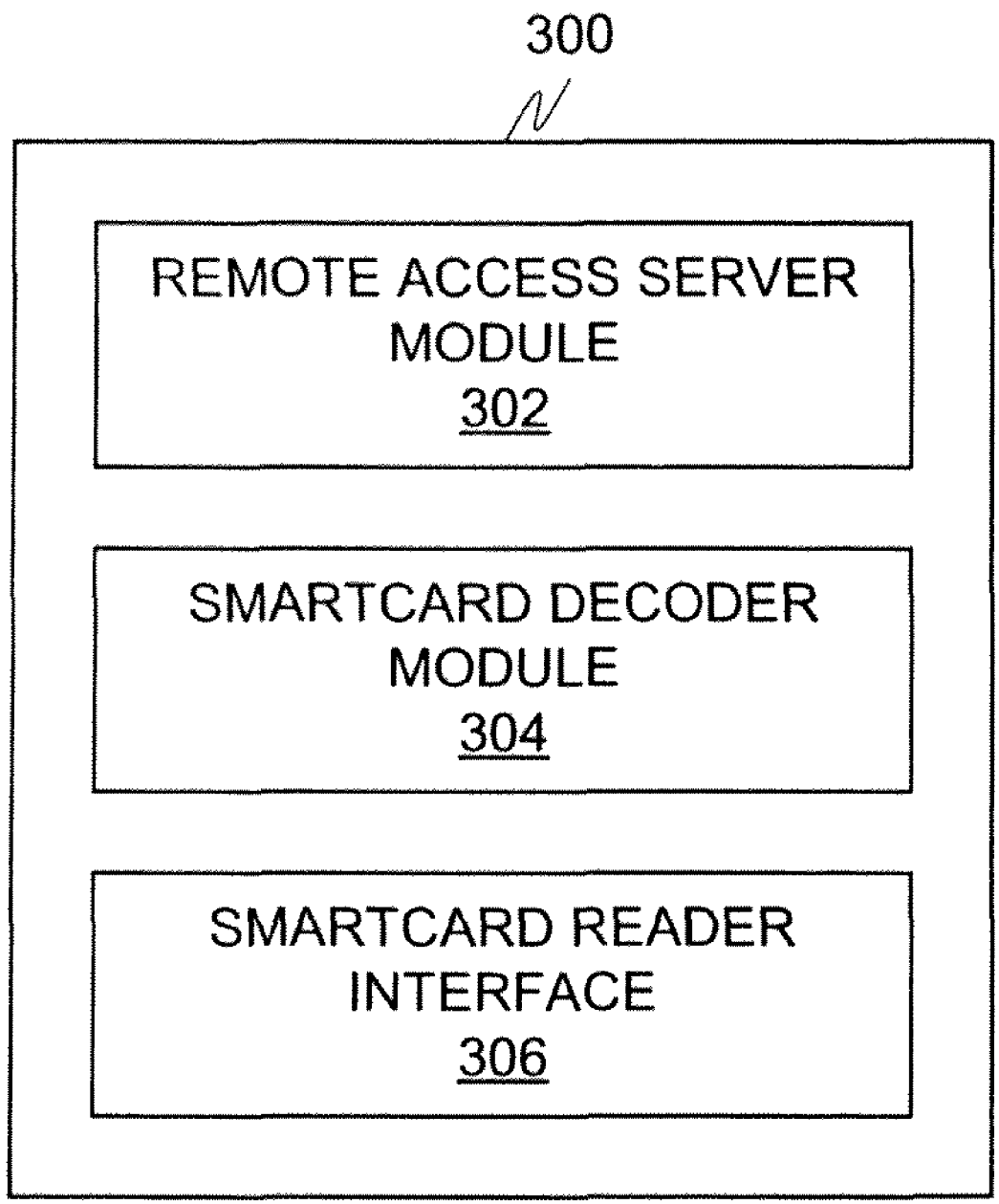
FIG. 3 illustrates a block diagram of one embodiment of a remote machine.

FIG. 3 illustrates one embodiment of a remote machine 300 for use in the network architecture 100 of FIG. 1. Remote machine 300 may include several modules or components: a remote access server module 302, a smart card decoder module 304, and a smart card reader interface 306. Smart card reader interface 306 interfaces with card reader 112 and allows remote machine 300 to read a smart card inserted in card reader 112. Smart card module 304 communicates with smart card reader interface 306 to read and decode/decrypt any information (e.g. credentials) on the smart card 112. Access to remote machine 300 may be granted to a user upon presentation of a valid smart card. A user physically present at the remote machine 300 may insert his smart card in the card reader 112. Smart card decoder module 304 obtains credentials from the inserted smart card via smart card reader interface 306. Another verification module (not shown) may verify the validity of the credentials to grant access to the user of the smart card. In accordance with another embodiment, further authentication means may be used to verify the identity of the user. For example, a login query may be presented to the user of the smart card. The login query may be a username and password, or a challenge based on the credentials obtained in the presented smart card. Those of ordinary skills in the art will recognize that many other means of authentication may exist and be further added.

Remote access server module 302 are well known to those of ordinary skills in the art and include applications allowing a user to remotely access a computer via a network. Such application may be web-based, or application-based. In one embodiment, an add-on or plug-in module enabling a communication of credentials of a smart card at another location may be installed on the remote machine 300. In one embodiment, remote access server module 302 is enabled to receive credentials provided by remote access client module 202 of a local machine 200 via a network. The means of communication between local machine 200 and remote machine 300 may be encrypted with various encryption means as known to those of ordinary skills in the art.

Figure 5:
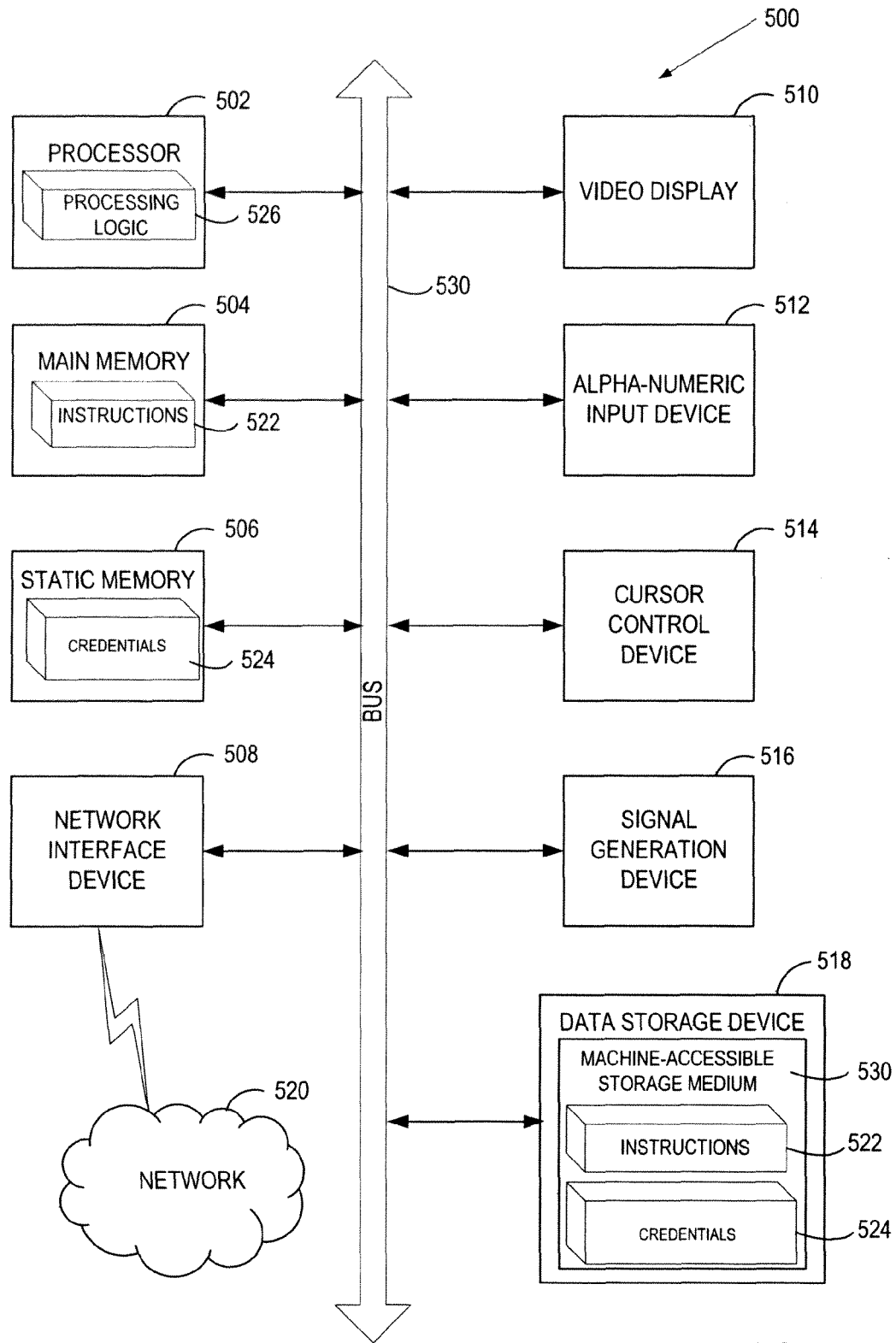
FIG. 5 illustrates a block diagram of an exemplary remote computer system.

FIG. 5 illustrates a diagrammatic representation of a machine in the exemplary form of a computer system 500 illustrative of remote machine 300. In one embodiment, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an input device 512 (e.g., a keyboard or a card reader), a cursor control device 514 (e.g., a mouse), and a signal generation device 516 (e.g., a speaker).

The data storage device 518 may include a machine-accessible storage medium 530 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-accessible storage media. The software 522 may further be transmitted or received over a network 520 via the network interface device 508.

The machine-accessible storage medium 530 may also be used to store credentials 524 or smart card information obtained from the smart card. Credentials 524 may also be stored in other sections of computer system 500, such as static memory 506. In accordance with another embodiment, credentials from the smart card may not be saved anywhere on computer system 500.

While the machine-accessible storage medium 530 is shown in an exemplary embodiment to be a single medium, the term "machine-accessible storage medium" should be taken to include a single medium or multiple media (e.g., a centralized or distributed database, and/or associated caches and servers) that store the one or more sets of instructions.

The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

Local Machine Operation

Figure 6:
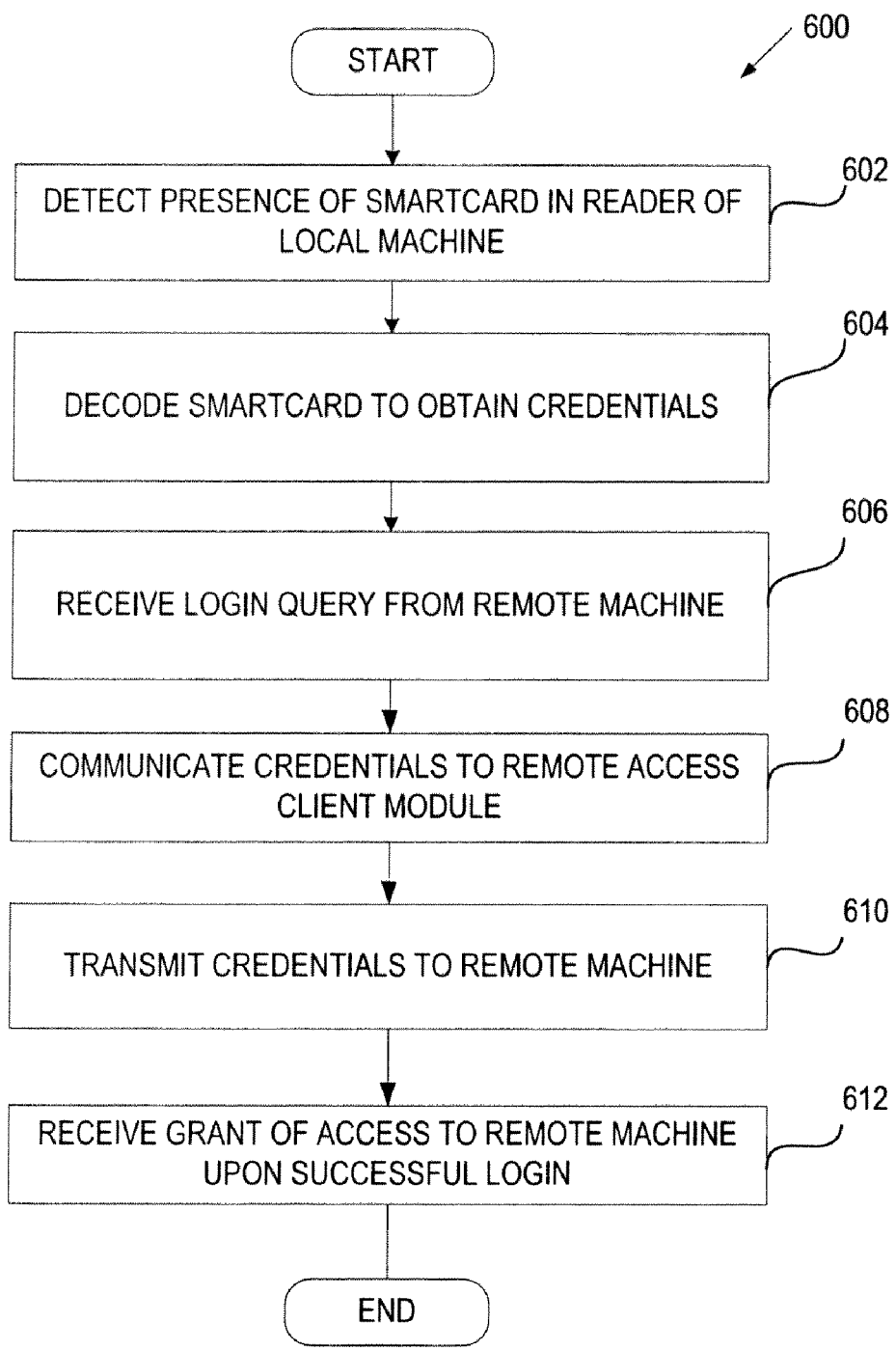
FIG. 6 illustrates a flow diagram of one embodiment of a method for accessing a remote machine from a local machine via smart card.

FIG. 6 illustrates a flow diagram of one embodiment of a method for accessing a remote machine from a local machine via a smart card. At 602, the presence of a smart card inserted in a card reader coupled to the local machine is detected. At 604, information on the smart card is read, decoded (or also decrypted) to obtain credentials from the smart card. When local machine attempts to access the remote machine, a login information query is received at 606 from the remote machine to authenticate the identity of the user of the smart card at the local machine. Credentials are communicated to a remote access client module of the local machine at 608. The remote access client module further transmits the credentials of the smart card to the remote machine at 610. In one embodiment, the credentials are transmitted to a remote access server of the remote machine. Upon valid credentials, as determined by the remote machine, the user is granted remote access to the remote machine at 612.

In accordance with another embodiment, the user may be able to first establish a connection with the remote machine by supplying his login information first (e.g. username and password). Upon valid login information, the user may be then prompted to provide his smart card.

In accordance with one embodiment, the communication over a network between the local machine and the remote machine may be secured via any encryption means. In accordance with another embodiment, the remote access client application of the local machine communicates with a remote access server application of the remote machine via the network.

Remote Machine Operation

Figure 7:
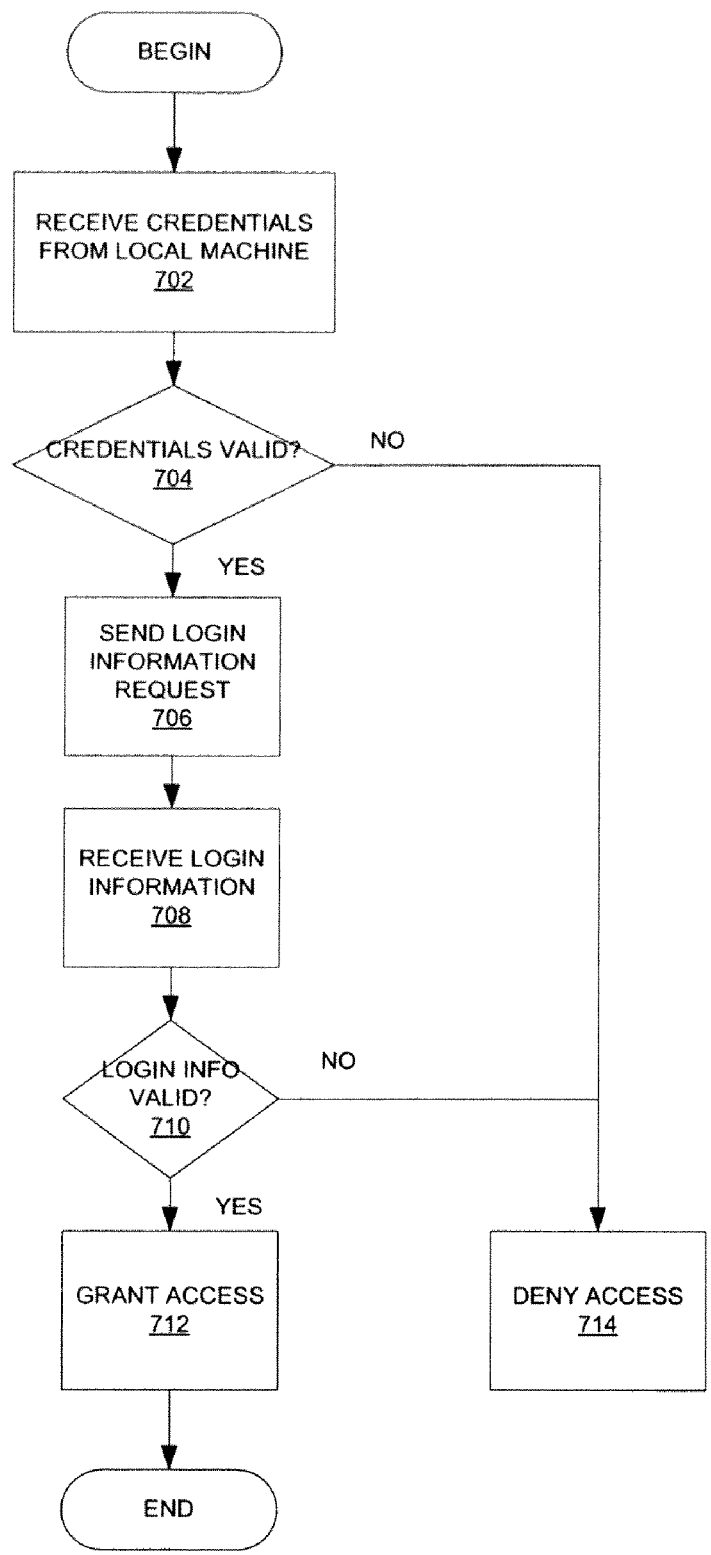
FIG. 7 illustrates a flow diagram of another embodiment of a method for accessing a remote machine from a local machine via smart card.

FIG. 7 illustrates a flow diagram of one embodiment of a method for accessing a remote machine from a local machine via a smart card. At 702, the remote machine receives credentials of the smart card locally coupled to the local machine. At 704, the validity of the credentials of the smart card is determined. If the credentials are found to be not valid, the remote machine denies access at 714; the local machine is not permitted to access the remote machine.

If the credentials are valid, a login information request or query may be sent out to the local machine for further authentication at 706. A response is received at 708 containing the login information (e.g. Username, password). The validity of the received login information is determined at 710. If the login information is deemed invalid, access to the remote machine may be denied at 714. If the received login information is valid, access to the remote machine may be granted at 712.

In accordance with another embodiment, the user may be able to first establish a connection with the remote machine by supplying his login information first. Upon valid login information, the user may then be prompted to provide his smart card.

In accordance with one embodiment, a card reader may be coupled to the local machine to read the smart card to obtain the credentials of the smart card. In accordance with one embodiment, the communication over a network between the local machine and the remote machine may be secured via any encryption means.

In accordance with another embodiment, the remote access server application of the remote machine communicates with a remote access client application of the client machine via the network.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method for accessing a remote machine from a local machine via a smart card, implemented by the local machine programmed to perform the following, comprising:
   detecting a presence of the smart card coupled to the local machine;
   in response, prompting a user to enter a personal identification number (PIN) to access credentials stored on the smart card;
   upon receiving a valid PIN from the user, obtaining the credentials stored on the smart card and transmitting the credentials to the remote machine over a network to allow the user to remotely access the remote machine from the local machine via the network;
   upon valid credentials, receiving a prompt from the remote machine to request login credentials from the user at the local machine;
   receiving the login credentials from the user at the local machine;
   transmitting the received login credentials to the remote machine over the network; and
   upon valid login credentials, receiving a grant to access the remote machine from the remote machine over the network.

2. The method of claim 1 wherein the credentials comprises a client certificate, and wherein the login credentials comprise a username and a password.

3. The method of claim 1 wherein detecting the presence of the smart card further comprises reading the smart card with a card reader coupled to the local machine.

4. The method of claim 1 wherein said transmitting the credentials to the remote machine over the network comprises mutually authenticating the remote machine and the local machine using the credentials.

5. The method of claim 1 wherein the credentials comprises a client certificate, and wherein said transmitting the credentials to the remote machine over the network comprise transmitting the certificate to the remote server, wherein the remote server validates the certificate with a certificate authority.

6. A method for accessing a remote machine from a local machine via a smart card, implemented by a remote machine programmed to perform the following, comprising:
   receiving, from the local machine over a network, credentials stored on a smart card coupled to the local machine, wherein the local machine obtains the credentials stored on the smart card by prompting a user to enter a personal identification number (PIN) to access the credentials stored on the smart card;
   upon valid credentials, transmitting a prompt to request login credentials from the user at the local machine;
   receiving the login credentials, entered by the user at the local machine, from the local machine over the network; and
   upon valid login credentials, granting access to the local machine.

7. The method of claim 6 wherein the credentials comprises a client certificate, and wherein the login credentials comprise a username and a password.

8. The method of claim 6 further comprising:
denying access to the remote machine if the credentials are not valid; and
denying access to the remote machine if the login credentials are not valid.

9. The method of claim 6 wherein a card reader coupled to the local machine is to read the smart card to obtain the credentials of the smart card.

10. The method of claim 6 wherein said receiving the credentials comprises mutually authenticating the remote machine and the local machine using the credentials.

11. The method of claim 6, wherein the credentials comprises a client certificate, and wherein said receiving the credentials comprises receives the certificate from the local machine, and wherein the method further comprises validating the certificate with a certificate authority.

12. A non-transitory machine-accessible storage medium including data that, when accessed by a machine, cause the machine to perform a method for accessing a remote machine from a local machine via a smart card, the method comprising:
detecting a presence of the smart card coupled to the local machine;
in response, prompting a user to enter a personal identification number (PIN) to access credentials stored on the smart card;
upon receiving a valid PIN from the user, obtaining the credentials stored on the smart card and transmitting the credentials to the remote machine over a network to allow the user to remotely access the remote machine from the local machine via the network;
upon valid credentials, receiving a prompt from the remote machine to request login credentials from the user at the local machine;
receiving the login credentials from the user at the local machine;
transmitting the received login credentials to the remote machine over the network; and
upon valid login credentials, receiving a grant to access the remote machine from the remote machine over the network.

13. The non-transitory machine-accessible storage medium of claim 12 wherein the credentials comprises a client certificate, and wherein the login credentials comprise a username and a password.

14. The non-transitory machine-accessible storage medium of claim 12 wherein detecting the presence of the smart card further comprises reading the smart card with a card reader coupled to the local machine.

15. The non-transitory machine-accessible storage medium of claim 12 wherein said transmitting the credentials to the remote machine over the network comprises mutually authenticating the remote machine and the local machine using the credentials.

16. A non-transitory machine-accessible storage medium including data that, when accessed by a machine, cause the machine to perform a method for accessing a remote machine from a local machine via a smart card, the method comprising:
receiving, from the local machine over a network, credentials stored on a smart card coupled to the local machine, wherein the local machine obtains the credentials stored on the smart card by prompting a user to enter a personal identification number (PIN) to access the credentials stored on the smart card;
upon valid credentials, transmitting a prompt to request login credentials from the user at the local machine;
receiving the login credentials, entered by the user at the local machine, from the local machine over the network; and
upon valid login credentials, granting access to the remote machine.

17. The non-transitory machine-accessible storage medium of claim 16 wherein the credentials comprises a client certificate, and wherein the login credentials comprise a username and a password.

18. The non-transitory machine-accessible storage medium of claim 16 wherein said receiving the credentials comprises mutually authenticating the remote machine and the local machine using the credentials.

19. The non-transitory machine-accessible storage medium of claim 16 wherein a card reader coupled to the local machine is to read the smart card to obtain the credentials of the smart card.

* * * * *